US009765927B2

(12) United States Patent
Zanettacci et al.

(10) Patent No.: US 9,765,927 B2
(45) Date of Patent: Sep. 19, 2017

(54) FLANGE FITTING

(71) Applicant: Spirax-Sarco Limited, Cheltenham, Gloucestershire (GB)

(72) Inventors: Charles Zanettacci, Cheltenham (GB); Keith Farquhar, Cheltenham (GB)

(73) Assignee: Spirax-Sarco Limited, Cheltenham (GB)

( * ) Notice: Subject to any disclaimer, the term of this patent is extended or adjusted under 35 U.S.C. 154(b) by 148 days.

(21) Appl. No.: 14/735,255

(22) Filed: Jun. 10, 2015

(65) Prior Publication Data
US 2015/0369408 A1 Dec. 24, 2015

(30) Foreign Application Priority Data
Jun. 20, 2014 (GB) .................................. 1411018.3

(51) Int. Cl.
*F16L 23/00* (2006.01)
*F16T 1/08* (2006.01)
*F16L 23/028* (2006.01)

(52) U.S. Cl.
CPC .............. *F16T 1/08* (2013.01); *F16L 23/003* (2013.01); *F16L 23/0286* (2013.01)

(58) Field of Classification Search
CPC . F16L 23/028; F16L 23/0286; F16L 23/0283; F16L 19/0206
USPC .................................. 285/412, 413, 414, 415
See application file for complete search history.

(56) References Cited

U.S. PATENT DOCUMENTS

| 2,568,414 | A | * | 9/1951 | Russ | F16L 23/125 |
| | | | | | 285/110 |
| 3,418,009 | A | | 12/1968 | Pollia | |
| 4,508,135 | A | | 4/1985 | Schlesch et al. | |
| 6,712,403 | B1 | * | 3/2004 | Dusevic | F16L 23/032 |
| | | | | | 285/363 |
| 7,712,797 | B2 | * | 5/2010 | Lum | F16K 5/0626 |
| | | | | | 285/368 |
| 2005/0225089 | A1 | * | 10/2005 | Ben-Horin | F16L 23/0286 |
| | | | | | 285/414 |
| 2007/0152446 | A1 | * | 7/2007 | Eriksson | F16L 23/0286 |
| | | | | | 285/412 |
| 2015/0260320 | A1 | * | 9/2015 | Huang | F16L 23/0286 |
| | | | | | 285/414 |

FOREIGN PATENT DOCUMENTS

| DE | 2053147 A1 | 4/1972 |
| JP | 2000145982 A | 5/2000 |
| WO | 2013103336 A1 | 7/2013 |

OTHER PUBLICATIONS

Oct. 22, 2015—(EP) Search Report—App 15165588.3—6 pages.
Intellectual Property Office of Great Britain, "Search Report," issued in connection with GB1411018.3, Nov. 26, 2014, 3 pages.

* cited by examiner

*Primary Examiner* — Aaron Dunwoody
(74) *Attorney, Agent, or Firm* — Banner & Witcoff, Ltd.

(57) ABSTRACT

There is disclosed a flange fitting for a pipe comprising: a flange ring for locating around the pipe and having a plurality of angularly spaced fixing holes; and a retaining ring for locating around the pipe within a groove in the outer surface thereof which in use restricts axial movement of the flange ring on the pipe; wherein the retaining ring has a plurality of angularly spaced reduced-profile sectors in regions corresponding to the positions of the fixing holes.

16 Claims, 4 Drawing Sheets

FLANGE FITTING

RELATED APPLICATIONS

This application claims priority to GB 1411018.3, filed on 20 Jun. 2014, which is hereby incorporated by reference in its entirety for any and all non-limiting purposes.

BACKGROUND

The invention relates to a flange fitting for a pipe.

Pipes with integral flanges are frequently used to allow two adjacent pipes to be joined together end-to-end by fastening their respective flanges, for example by fastening bolts. However, it may be desirable or necessary to fit a flange to a pipe having no integral flange.

It is known to join a separate flange ring to a pipe. This may be done by welding. An alternative method is to locate a flange ring around a pipe before fitting a retaining ring in a groove formed towards an end of the pipe, thereby forming a flange fitting. The retaining ring radially projects from the pipe and therefore prevents axial movement of the flange ring beyond the retaining ring. When the flange ring is coupled with a corresponding flange, its axial position is limited by the retaining ring.

In such an arrangement, the retaining ring must be located radially inward of the bolt holes in the flange ring. The dimensions of a flange ring and the positions of the bolt holes are typically set according to a common standard or to correspond to an opposing flange. Consequently, the pitch radius of the bolt holes (i.e. the radius of the circle on which the bolt holes lie) and their diameter typically determines the size of the radially inward space available for accommodating a retaining ring. Where this space is limited, the size of a corresponding retaining ring may be limited to the extent that the structural integrity of the respective flange fitting would be compromised. In such circumstances, it may be necessary to weld the flange ring directly onto the pipe to form a permanent connection.

For these and other reasons, improved systems and methods are desired, including an improved flange fitting.

SUMMARY

According to an embodiment of the invention there is provided a flange fitting for a pipe comprising: a flange ring for locating around the pipe and having a plurality of angularly spaced fixing holes; and a retaining ring for locating around the pipe within a groove in the outer surface thereof which in use restricts axial movement of the flange ring on the pipe; wherein the retaining ring has a plurality of angularly spaced reduced-profile sectors in regions corresponding to the positions of the fixing holes.

The fixing holes may be located on a pitch line of constant radius. In other words, the fixing holes may have a common pitch radius. The centres of the fixing holes (i.e. the axes of the holes) may be located on the pitch line. The angular spacing of the reduced-profile sectors may correspond to the angular spacing of the fixing holes.

Each reduced-profile sector may have a cross-sectional area per unit angle less than the cross-sectional area per unit angle of the retaining ring as a whole. The retaining ring may have a non-circular outer profile.

The retaining ring may define a flange-facing surface for abutting the flange ring to restrict axial movement of the flange ring on the pipe. Sectors of the flange-facing surface corresponding to the reduced-profile sectors of the retaining ring may have an area per unit angle less than that of the flange-facing surface as a whole. The outer peripheries of the flange-facing surface of the reduced-profile sectors may lie within the circumscribed circle of the flange-facing surface. The flange-facing surface may be annular. The flange-facing surface may be normal to the axial direction of the flange fitting.

The retaining ring may comprise a plurality of first-type sectors and a plurality of second-type sectors alternately and angularly arranged. The second-type sectors may be the reduced-profile sectors and the outer profile of the second-type sectors may be reduced relative to the outer profile of the first-type sectors.

First-type sectors may differ from one another. Similarly, second-type sectors may differ from one another. For instance, first-type sectors may not have the same angular extent or outer periphery (i.e. outer profile). Similarly, second-type sectors may not have the same angular extent or outer periphery (i.e. outer profile).

The outer peripheries (i.e. the outer profiles) of the first-type sectors may be generally circular. The outer peripheries of the sectors of the retaining ring may be the outer peripheries of the flange-facing surface of the respective sectors.

The radial separation between the fixing holes and the outer peripheries of the second-type sectors may be greater than the radial separation between the fixing holes and the outer peripheries of the first-type sectors of the retaining ring. In other words, the outer peripheries of the first-type sectors may be radially outward of the outer peripheries of the second-type sectors. The radial extent of the first-type sectors may overlap with the radial extent of the fixing holes.

The outer peripheries of the first-type sectors may define arcs of a common circle (i.e. the profile of the first-type sectors may be circular). The outer peripheries of the second-type sectors may lie within the common circle. The outer peripheries of the second-type sectors may lie within the circumscribed circle of the retaining ring. The circumscribed circle may be the circumscribed circle of the flange-facing surface of the retaining ring. The outer profile of the second-type sectors may lie within the circumscribed cylinder of the retaining ring.

The radius of the common circle defined by the outer peripheries of the first-type sectors may be greater than the radial distance to the fixing holes of the flange ring. Accordingly, the common circle may intersect the fixing holes. The radial distance to the fixing holes is the radial distance from the axis of the flange fitting to the radially inner point of the fixing holes (rather than the axis of the fixing hole).

The outer peripheries of the second-type sectors may be substantially linear. The outer peripheries of the flange-facing surfaces of the second-type sectors may be substantially linear. The outer profile of the second-type sectors may be substantially planar.

There may be an equal number of first-type sectors and second-type sectors. There may be two first-type sectors and two second-type sectors. The two second-type sectors may be diametrically opposed. The sector angle of the second-type sectors may be less than the sector angle of the first-type sectors.

The retaining ring may comprise two discrete parts. The two discrete parts may be arranged to be joined along a line that bisects two diametrically opposed reduced-profile sectors of the retaining ring.

The retaining ring may have rotational symmetry. The retaining ring may have a uniform cross-section along its axial length.

The retaining ring may be in the form of an annulus having truncated sides that define the outer peripheries of the respective reduced-profile sectors.

The flange ring may have a recess for receiving the retaining ring which corresponds to the outer profile of the retaining ring.

There is also provided a flange assembly comprising a pipe having a groove in its outer surface and a flange fitting according to the invention, wherein the flange ring is located around the pipe, and wherein the retaining ring is located around the pipe within the groove to restrict the axial movement of the flange ring on the pipe.

The retaining elements may be configured for a friction fit in the groove of the pipe. The retaining ring may restrict the axial movement of the flange ring on the pipe in one axial direction. The retaining ring may restrict the axial movement of the flange ring on the pipe in a direction towards a corresponding flange to which the flange ring is to be coupled, or to which the flange ring is coupled. The flange ring may have a circular opening. The diameter of the circular opening may be greater than the diameter of the pipe.

BRIEF DESCRIPTION OF THE DRAWINGS

The invention will now be described, by way of example, with reference to the drawings, in which.

It should be noted that any dimensions given in the following description are by way of example only.

DETAILED DESCRIPTION

Figure 1:
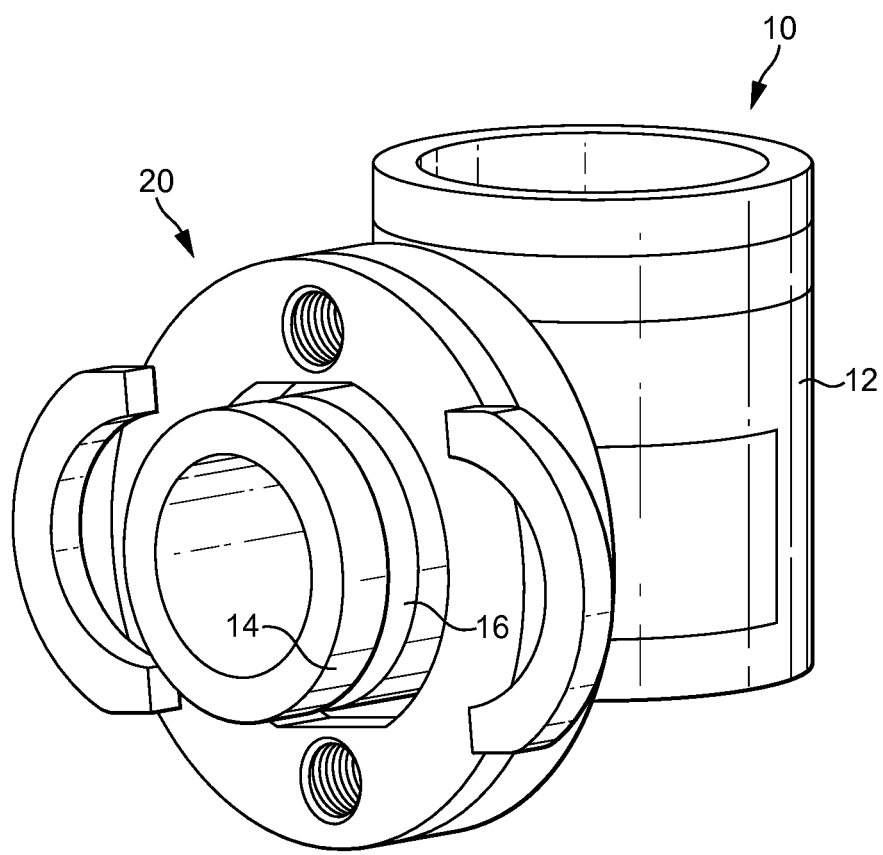
FIG. 1 schematically shows an exploded view of a steam trap and a flange fitting in accordance with one example embodiment.

FIG. 1 shows a steam trap 10 for controlling the discharge of condensate from a steam system and a flange fitting 20 for coupling the outlet pipe 14 of the steam trap 10 to another pipe having a flange (not shown).

The steam trap 10 has a trap body 12 and a longitudinally extending outlet pipe 14 for discharging fluid from the trap body 12. In this embodiment, the outlet pipe 14 has an outer diameter of 80 mm and a wall thickness of 15 mm. An annular groove 16 is formed in the outer surface of the pipe 14 towards the end of the pipe 14 furthest from the trap body 12. The groove 16 has an axial length of 10 mm and a radial depth of 5 mm.

Figure 2:
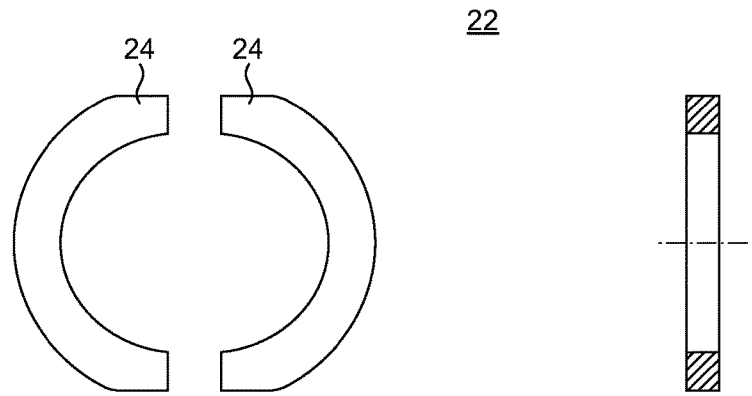
FIG. 2 schematically shows an example retaining ring of a flange fitting, in which the flange fitting may be similar or identical to the flange fitting shown in FIG. 1.
Figure 3:
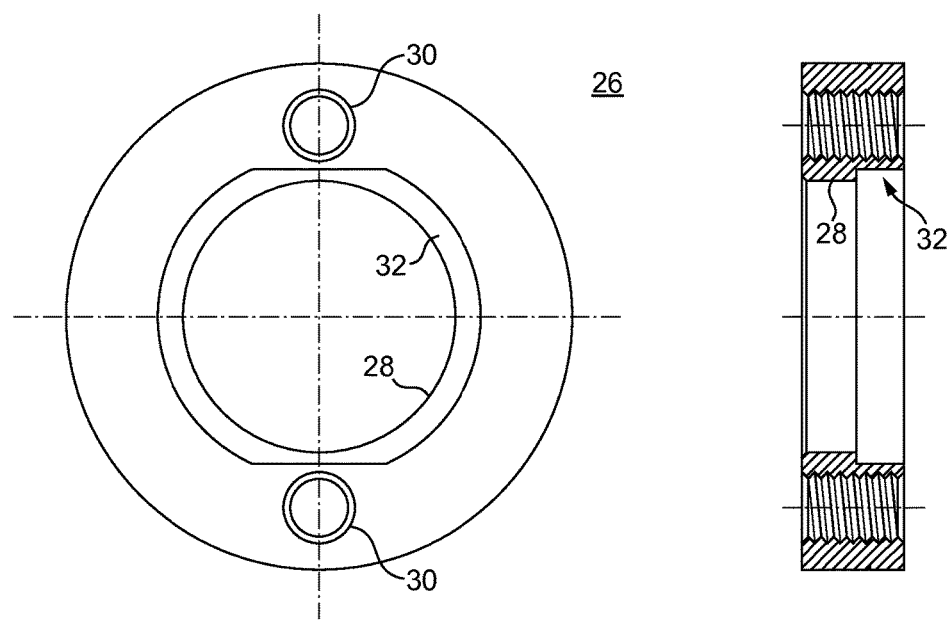
FIG. 3 schematically shows a flange ring of a flange fitting, in which the flange fitting may be similar or identical to the flange fitting shown in FIG. 1.

The flange fitting 20 comprises a retaining ring 22 (see, e.g., FIG. 2) and a flange ring 26 (e.g., FIG. 3).

The retaining ring 22 may be formed of two generally semi-annular retaining elements 24 that can be assembled together around the pipe 14 within the groove 16 of the outlet pipe 14. The example retaining ring 22 may have a constant thickness and has a uniform cross-section in a plane perpendicular to its axial direction. When assembled, the retaining ring 22 may be generally annular and has a central circular opening corresponding to the internal diameter of the groove 16, and a non-circular outer periphery with a maximum radius of 50 mm and a minimum radius of 45 mm.

The example flange ring 26 is a unitary (i.e. integrally formed) annular body having a central circular opening 28 sized to fit over the end of the outlet pipe 14, and a series of angularly spaced bolt holes 30 for fastening the flange ring 26 to a corresponding flange (not shown). In this embodiment, the diameter of the central opening 28 is 80 mm and the outer diameter of the flange ring is 160 mm. Two diametrically opposed bolt holes 30, each of 15 mm diameter, extend through upper and lower regions of the flange ring 26. The centres of the bolt holes 30 are diametrically spaced apart by 125 mm. In other words, the bolt holes 30 lie on a pitch line having a radius of 62.5 mm (i.e. a pitch diameter of 125 mm). Therefore, the clearance between each bolt hole and the outer periphery of the flange ring 26 is 10 mm and the clearance between each bolt hole and the central circular opening 28 is 15 mm.

In this example, the flange ring 26 has an overall axial length of 20 mm and has a 10 mm deep recess 32 for receiving the retaining ring 22. The recess 32 is shaped to correspond to the outer profile of the retaining ring 22.

Figure 4:
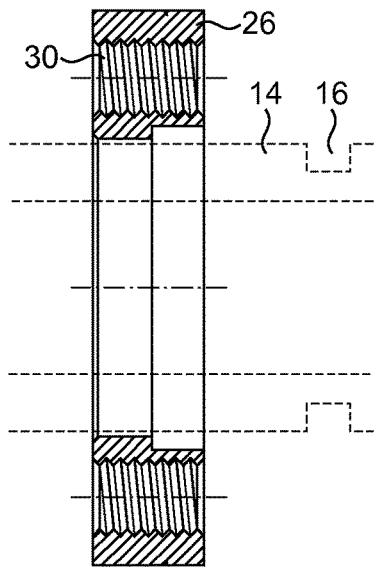
FIG. 4 schematically shows a flange ring, such as the flange ring shown in FIG. 3, located around the outlet pipe of the steam trap.
Figure 5:
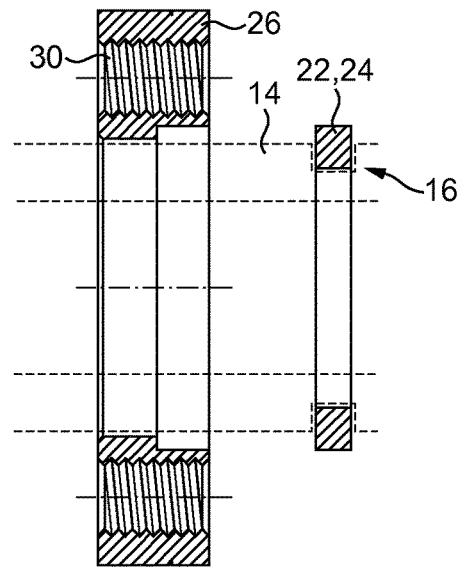
FIG. 5 schematically shows a flange ring and a retaining ring, such as shown in any of FIGS. 1-4, located around the outlet pipe of the steam trap.
Figure 6:
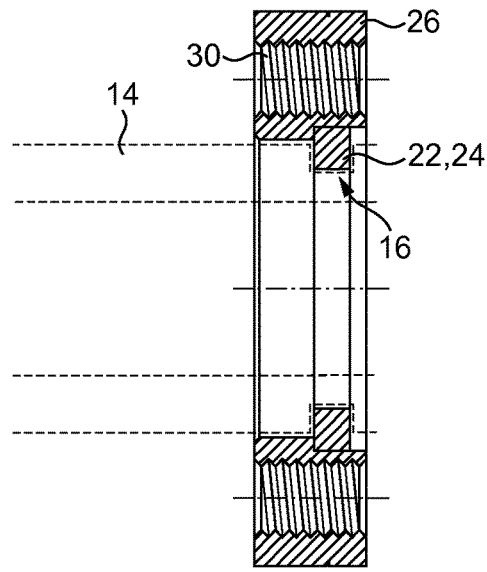
FIG. 6 schematically shows a flange ring against a retaining ring on the outlet pipe of the steam trap in accordance with one embodiment.

To couple or attach the outlet pipe 14 to another pipe having a flange (not shown), the flange fitting 20 can be used as follows. The flange ring 26 is located around the outlet pipe 14 by axially sliding it over the end of the outlet pipe 14 and past the groove 16 towards the trap body 12 (e.g., FIG. 4). The two retaining elements 24 may then assembled around the outlet pipe 12 within the groove 16 to form the retaining ring 22, which is temporarily held in place by a friction fit in the groove 16 (e.g., see FIG. 5). The flange ring 26 is then moved axially towards the retaining ring 22 (i.e. towards the end of the pipe) so that the retaining ring 22 is located in the corresponding recess 32 of the flange ring 26 (e.g., see FIG. 6). The recess wall of the recess 32 holds the two retaining elements 24 together in the groove 16.

The retaining ring 22 is prevented from moving axially since it is received within the groove 16. Accordingly, with the retaining ring 22 received in the recess 32, axial movement of the flange ring 26 past the retaining ring 22 (i.e. away from the trap body) is prevented. When the flange ring 26 is coupled to a corresponding flange, for example an integral flange of a corresponding pipe (not shown), the flange ring 26 is urged against the retaining ring 22 and therefore held in position on the end of the outlet pipe 14 by the retaining ring 22. For example, the flange ring 26 may be coupled to a corresponding flange by bolts passing through the bolt holes 30 and into the corresponding flange.

Flange couplings are typically tightened to compress adjacent flanges together and form a seal therebetween. Flange couplings therefore undergo a high axial compression load. In flange fittings that use a retaining ring 22, the axial load is transmitted from the flange ring 26 to the pipe 14 via the retaining ring 22. The retaining ring 22 must therefore be sufficiently strong to resist the axial load without excessive bending or shearing.

The flange fitting 20 of certain embodiments of the invention is designed to maximise the load bearing area of the retaining ring 22 against the flange ring 26, for example where the position of the bolt holes 30 limit the radially inward space available for the retaining ring 22, or where it is desirable to minimise the size (i.e. the outer profile) of the flange fitting 20. This may be desirable in certain implementations because a high load bearing area reduces the pressure force experienced by the components of the flange fitting 20, which in turn reduces the likelihood of the flange fitting 20 suffering material failure or a failure owing to over-tightening of the flange coupling.

Figure 7:
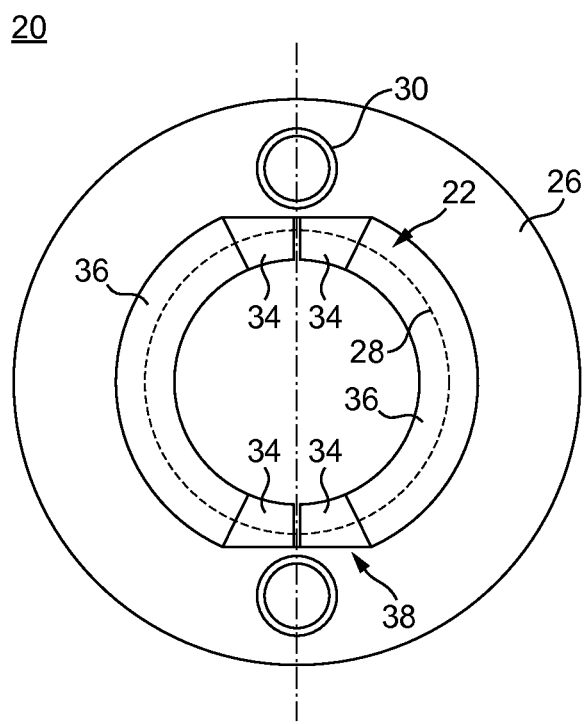
FIG. 7 schematically shows a retaining ring received in the recess of a flange ring according to another embodiment disclosed herein.

As shown in FIG. 7, the illustrated retaining ring 22 has a non-circular outer periphery that defines first-type sectors 36 (or standard sectors) having a generally circular outer profile and second-type sectors 34 (or reduced-profile sectors) that have a reduced outer profile relative to the first-type or standard sectors. The recess 32 of the flange ring 26 has reduced-profile portions 38 that correspond to the outer peripheries of the reduced-profile sectors 34 of the retaining ring. Accordingly, the retaining ring 22 can only be received in the recess 32 of the flange ring 26 when the reduced outer profile sectors 34 and reduced-profile portions 38 of the retaining ring 22 and flange ring 26 respectively are aligned.

In this particular embodiment, the retaining ring 22 is in the form of an annulus with opposing truncated parallel sides. The opposing truncated parallel sides define the reduced-profile sectors 34 of the retaining ring 22 in the region of the bolt holes 30. The reduced-profile sectors 34 are separated from each other by the standard sectors 36, the outer peripheries of which define an arc of a circle. The outer peripheries of the reduced-profile sectors 34 depart from and lie within the arc of this circle. In other words, the radial extent of the reduced-profile sectors is less than that of the standard sectors 36 (i.e. the remainder of the retaining ring 22), or the outer peripheries of the reduced-profile sectors 34 depart from and lie within the circumscribed circle of the retaining ring 22.

In this embodiment, the pitch radius of the bolt holes 30 is defined by a common standard to which the flange fitting 20 must conform. The effect of the standard-type and reduced-profile sectors 36, 34 is to allow the pitch radius (or pitch diameter) of the bolt holes 30 to conform to the common standard whilst ensuring the structural integrity of the flange fitting. In particular, this requires maintaining adequate clearance between the bolt holes 30 and the recess wall of the recess 32, and providing a sufficient load bearing area between the retaining ring 22 and the flange ring 26.

In this embodiment, the radius of the retaining ring 22, and so the radial distance to the recess wall, is reduced from the maximum radius of 50 mm to 45 mm in the regions local to the bolt holes 30, and so the pitch radius can be as low as 62.5 mm whilst maintaining a 10 mm clearance between the bolt holes 30 mm and the recess wall.

Further, as discussed above, it may be desirable in certain embodiments to maximize the load bearing area between the retaining ring 22 and the flange ring 26, or at least to offset the relative reduction in load bearing area associated with the reduced-profile sectors 34. As can be seen from FIG. 7, the load bearing area between the flange-facing surface(s) of the reduced-profile sectors 34 is proportionally less than the load bearing area of the standard sectors 34, owing to the reduced radial extent of the retaining ring 22 in these sectors 34. In other words, the radial extent of the retaining ring 22 is increased away from the reduced-profile sectors 34 so as to increase the load bearing area of the retaining ring 22 against the flange ring 26 as a whole.

It can therefore be seen in at least the illustrative embodiment, that the load bearing area of the retaining ring 22 is proportionally weighted to sectors of the retaining ring 22 away from the reduced-profile sectors 34 (i.e. away from the bolt holes 30). In such an implementation, this means that the load bearing area per unit angle is less for the reduced-profile sectors 34 than for the retaining ring 22 as a whole. This allows the pitch radius of the bolt holes to conform to the common standard whilst maintaining adequate clearance between the bolt holes and the recess wall, and whilst maximising the load bearing area of the retaining ring against the flange.

In contrast, if the retaining ring were circular (as in the prior art), the maximum radius would be limited to 45 mm in order to maintain the same 10 mm clearance with the bolt holes 30, and the load bearing area between the retaining ring 22 and the flange ring 26 may not be sufficient to ensure the structural integrity of the flange fitting.

In an alternative embodiment, the pitch radius and diameter of the bolt holes 30 may not be predetermined, and the design of the flange fitting 20 may be oriented to minimizing its outer profile, for example, to define a new common standard or for a bespoke flange.

Again, it is necessary to locate the bolt holes 30 in the flange ring 26 radially outwardly of the retaining ring 22. Accordingly, the use of a retaining ring 22 according to the invention having reduced-profile sectors 34 in the region of the bolt holes 30 allows the pitch radius of the bolt holes 30 (and so the profile of the flange fitting) to be minimized, whilst maintaining adequate clearance between the bolt holes and the recess wall, and while providing sufficient load bearing area between the retaining ring and the flange ring. Again, the load bearing area is weighted to sectors away from the bolt holes (i.e. the standard-type sectors 36).

In contrast, if the retaining ring were circular so that there were no reduced-profile sectors (as in the prior art), its radius would necessarily be larger than the reduced-profile sectors 34, for example 50 mm, in order to provide sufficient load-bearing area between the retaining ring and the flange ring. Consequently, the pitch radius of the bolt holes would also be larger, for example 67.5 mm, in order to retain the same 10 mm clearance.

Although illustrative embodiments of the invention have been described in which the retaining ring is a generally circular annulus and the reduced-profile sectors are defined by truncated parallel sides of the annulus, it will be appreciated by those skilled in the art, including those with the benefit of this disclosure, that the reduced-profile sectors can be formed in many different ways. For example, the reduced-profile sectors could have a circular outer periphery of reduced radius relative to standard sectors of the retaining ring, with a radial wall extending between each reduced outer profile sector and the adjacent standard sector. Alternatively, cut-outs could be formed in an otherwise generally circular retaining ring to define the reduced-profile sectors. For example, the cut-outs could be semi-circular so as to maintain a constant clearance around the bolt holes.

In addition, the retaining ring need not be generally circular. For example, the retaining ring could be in the form of a many-sided polygon, whilst still fitting suitably within a recess of a generally circular flange ring. In other examples, the flange ring may be non-circular, for instance it may be square with a circular hole for the pipe. The retaining ring may be modified accordingly.

Although an embodiment of the invention has been described in which the radial extent of sectors of the retaining ring apart from the reduced-profile sectors do not overlap with the radial extent of the bolt holes, it will be appreciated that in other embodiments this may not be the case. For example, the maximum radius (or radial distance)

of the outer periphery of the retaining ring may be greater than the radial distance to the radially inner edge of a fixing hole.

We claim:

1. A flange fitting for a pipe comprising an outer surface, the flange fitting comprising:
    a flange ring configured to be located around the outer-surface of the pipe and having a plurality of angularly spaced fixing holes; and
    a retaining ring configured to be located within a groove in the outer surface of the pipe, which in use, restricts axial movement of the flange ring on the pipe, the retaining ring comprising:
    a plurality of angularly spaced reduced-profile sectors having a reduced outer-profile in regions corresponding to respective positions of the fixing holes of the flange ring when the flange ring is positioned around the outer surface of the pipe.

2. A flange fitting according to claim 1, wherein each reduced-profile sector has a cross-sectional area per unit angle that is less than the cross-sectional area per unit angle of the retaining ring as a whole.

3. A flange fitting according to claim 1, wherein the retaining ring comprises a plurality of first-type sectors and a plurality of second-type sectors alternately and angularly arranged, wherein the second-type sectors are the reduced-profile sectors and wherein the outer profile of the second-type sectors is reduced relative to an outer profile of the first-type sectors.

4. A flange fitting according to claim 3, wherein the outer peripheries of the first-type sectors define arcs of a common circle.

5. A flange fitting according to claim 4, wherein the radius of the common circle defined by the outer peripheries of the first-type sectors is greater than the radial distance to the fixing holes of the flange ring.

6. A flange fitting according to claim 3, wherein the outer peripheries of the second type sectors are substantially linear.

7. A flange fitting according to claim 3, wherein there are two first-type sectors and two second-type sectors.

8. A flange fitting according to claim 7, wherein the two second-type sectors are diametrically opposed.

9. A flange fitting according to claim 3, wherein the sector angle of the second-type sectors is less than the sector angle of the first-type sectors.

10. A flange fitting according to claim 1, wherein the retaining ring comprises two discrete parts.

11. A flange fitting according to claim 10, wherein the two discrete parts are arranged to be joined along a line that bisects two diametrically opposed reduced-profile sectors of the retaining ring.

12. A flange fitting according to claim 1, wherein the retaining ring has rotational symmetry.

13. A flange fitting according to claim 1, wherein the retaining ring is in a form of an annulus having truncated sides that define an outer periphery of the respective reduced-profile sectors.

14. A flange fitting according to claim 1, wherein the flange ring has a recess for receiving the retaining ring which corresponds to an outer profile of the retaining ring.

15. A flange assembly comprising:
    a pipe comprising an outer surface, the outer surface having a groove;
    a flange fitting, comprising:
    a flange ring located around the outer-surface of the pipe and having a plurality of angularly spaced fixing holes; and
    a retaining ring located within the groove in a manner that, in use, restricts axial movement of the flange ring on the pipe, the retaining ring comprising:
    a plurality of angularly spaced reduced-profile sectors having a reduced outer-profile in regions corresponding to respective positions of the fixing holes of the flange ring when the flange ring is positioned around the outer surface of the pipe.

16. A flange fitting for a pipe having an outer surface, the flange fitting comprising:
    a flange ring configured to be located around the outer surface of the pipe and having a plurality of angularly spaced fixing holes; and
    a retaining ring configured to be located within a groove in the outer surface of the pipe, which in use, restricts axial movement of the flange ring on the pipe;
    wherein the retaining ring has a plurality of angularly spaced reduced-profile sectors having a reduced outer-profile in regions corresponding to respective positions of the fixing holes of the flange ring when the flange ring is positioned around the outer surface of the pipe;
    wherein each reduced-profile sector has a cross-sectional area per unit angle less than the cross-sectional area per unit angle of the retaining ring as a whole;
    wherein the retaining ring comprises a plurality of first-type sectors and a plurality of second-type sectors alternately and angularly arranged, wherein the second-type sectors are the reduced-profile sectors and wherein an outer profile of the second-type sectors is reduced relative to the outer profile of the first-type sectors;
    wherein there are two first-type sectors and two second-type sectors; and
    wherein the retaining ring comprises two discrete parts.

* * * * *